Jan. 31, 1928.
C. C. FARMER
1,657,531
FEED VALVE DEVICE
Filed Nov. 12, 1926
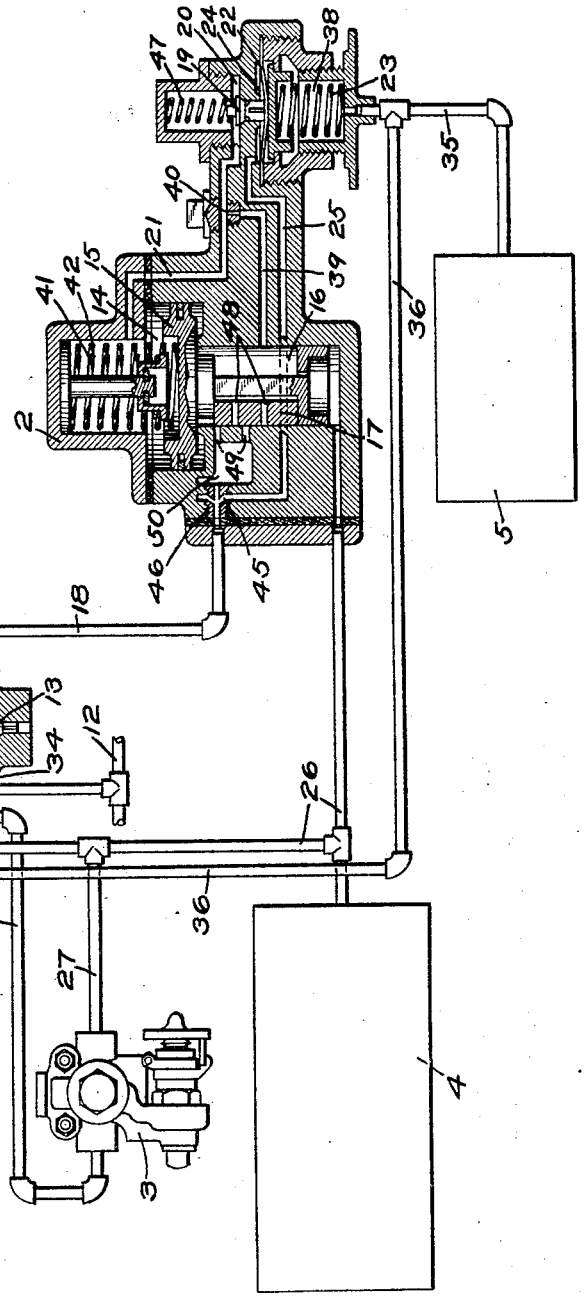
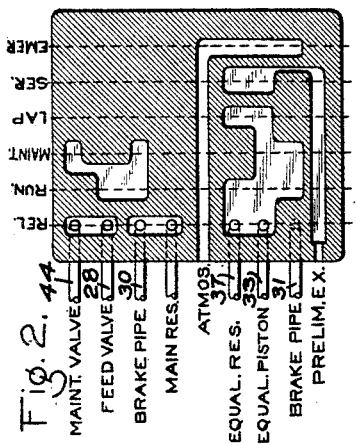
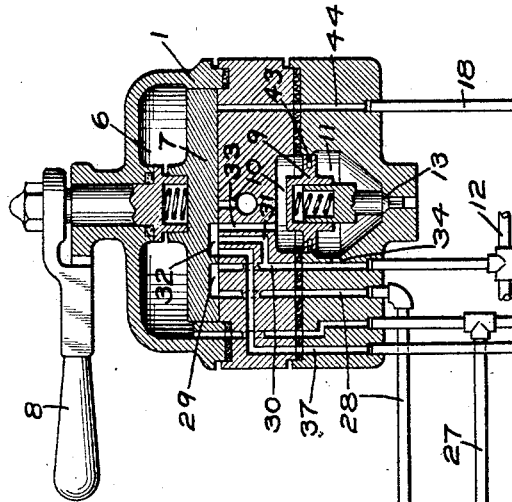
INVENTOR
CLYDE C. FARMER
BY Wm. M. Cady
ATTORNEY Patented Jan. 31, 1928.

1,657,531

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FEED-VALVE DEVICE.

Application filed November 12, 1926. Serial No. 147,913.

This invention relates to fluid pressure brakes and in particular to that type wherein the brakes are controlled by the operation of a brake valve device.

With the standard type of fluid pressure brakes, a service application is made by first moving the brake valve handle to service position to effect the desired reduction in brake pipe pressure, and then said handle is moved to lap position.

There is more or less leakage of the fluid under pressure from the brake pipe, by way of hose coupling gaskets or at pipe joints, so that after an application of the brakes and with the brake valve device in lap position, such leakage will cause a further reduction in brake pipe pressure and consequently a further undesired application of the brakes.

The principal object of my invention is to provide means for maintaining the brake pipe pressure against leakage, while the brakes are applied.

In the accompanying drawing; Fig. 1 is a diagrammatic view, mainly in section, of a fluid pressure brake equipment, embodying my invention; and Fig. 2 a diagrammatic development of the brake valve device of the construction shown in Fig. 1, showing the various operating positions.

According to the drawing, the fluid pressure brake equipment may comprise the usual brake valve device 1, a maintaining valve device 2, a feed valve device 3, a main reservoir 4, and an equalizing reservoir 5.

The brake valve device 1 may comprise a casing, having a chamber 6 in communication with the main reservoir 4 and containing a rotary valve 7, adapted to be operated by means of a handle 8.

The brake valve device also includes an equalizing piston 9, having at one side a chamber 10 adapted to be connected to the equalizing reservoir 5 in certain positions of the rotary valve 7, and at the opposite side a chamber 11 in constant communication with the brake pipe 12. The equalizing piston 9 is adapted to operate a discharge valve 13 which in turn controls communication from chamber 11 to the atmosphere.

Associated with the brake valve device 1 is a maintaining valve device 2 which may comprise a casing, having a piston chamber 14 containing a piston 15 and a valve chamber 16 containing a slide valve 17, adapted to be operated by piston 15 for controlling the supply of fluid from the main reservoir through pipe 18 to the brake valve device 1.

The maintaining valve device 2 also includes a regulating valve device, comprising a regulating valve 19 contained in a chamber 20 connected to piston chamber 14 by passage 21, and a flexible diaphragm 22 for operating said valve. Said diaphragm is subject on one side to the pressure of fluid in the equalizing reservoir 5 and also to the pressure of a spring 23, and has chamber 24 at the opposite side connected through passage 25 to pipe 18.

In operation, with the brake device 1 in running position as shown, fluid under pressure from the main reservoir 4 flows through pipes 26 and 27 to the feed valve device 3, which is adjusted to supply fluid at the standard pressure carried in the brake pipe 12. Fluid at the reduced pressure then flows through pipe and passage 28, cavity 29 in the rotary valve 7 of the brake valve device 1, and passage 30 to the brake pipe 12, so that the brake pipe pressure is maintained in running position of the brake valve device, in the usual way.

Fluid at brake pipe pressure from passage 30 flows through passage 31, cavity 32 in the rotary valve 7, and passage 33 into chamber 10 at one side of the equalizing piston 9, while chamber 11, at the opposite side, is connected through passage 34 to the brake pipe 12. The fluid pressures thus being equal on opposite sides of the equalizing piston 9, said piston is held in the position seating the discharge valve 13, as shown in the drawing, due to said valve being exposed to atmospheric pressure.

The equalizing reservoir 5 being connected through pipes 35 and 36 and passage 37 with cavity 32 in the rotary valve 7, said reservoir is also charged with fluid at brake pipe pressure.

Fluid at equalizing reservoir pressure is supplied through pipe 35 to chamber 38 and acts upon the diaphragm 22.

Fluid at main reservoir pressure is supplied through pipe 26 to valve chamber 16 of the maintaining valve device 2, and from chamber 16, fluid is supplied through passage 39 and a choke plug 40 to passage 21 and piston chamber 14, so that with the regulating valve 19 seated, the fluid pressure equalizes on opposite sides of the piston 15, permitting the springs 41 and 42 to maintain said piston and the slide valve 17 in the normal position, as shown in Fig. 1.

A service application of the brakes is effected by moving the brake valve handle 8 to service application position, in which fluid is vented from the equalizing reservoir 5 in the usual manner. After the equalizing reservoir pressure has been reduced the desired amount, the brake valve handle 8 is moved to lap position. The reduction in equalizing reservoir pressure on the equalizing piston 9 permits the brake pipe pressure on the opposite side of said piston to lift same and open the discharge valve 13, so that fluid is vented from the brake pipe 12. Fluid continues to be vented from the brake pipe until the brake pipe pressure acting in chamber 11, at one side of the equalizing piston 9, is reduced to a degree slightly less than the reduced equalizing reservoir pressure in chamber 10, when piston 9 operates to close the valve 13.

With the brake valve device in lap position, any leakage from the brake pipe 12 tends to cause a further reduction in brake pipe pressure. To prevent brake pipe leakage from effecting a further application of the brakes, as described above, the brake valve handle 8 is moved from lap position to a special additional position, termed maintaining position, after the discharge valve 13 has closed.

In maintaining position of the brake valve device 1, passage 33 is cut off from communication with the equalizing reservoir 5, and connects only with the chamber 10 at one side of the equalizing piston 9, thus preventing the possibility of fluid from the equalizing reservoir 5 leaking past the ring 43 in the equalizing piston 9, to the brake pipe and decreasing with the brake pipe pressure as said brake pipe pressure is effected by leakage.

Passage 37 from the equalizing reservoir 5 is also lapped by the rotary valve 7, in maintaining position of the brake valve handle 8, thereby isolating said reservoir so that the pressure therein and in chamber 38 of the maintaining valve device 2, remains constant and at the pressure obtained at the time the equalizing reservoir pressure is reduced in making a service application of the brakes.

In maintaining position, the brake pipe 12 is connected through passage 31 and a cavity in the rotary valve 7 to passage 44, thence through pipe 18, ports 45 in the Venturi tube 46, and passage 25 to chamber 24 at one side of the diaphragm 22. Thus brake pipe pressure in chamber 24 opposes equalizing reservoir pressure in spring chamber 23, on the opposite side of diaphragm 22.

If there is no brake pipe leakage, the brake pipe pressure in chamber 24 holds the diaphragm 22 in the position shown in the drawing, against the equalizing reservoir pressure acting at the opposite side of said diaphragm, and consequently the regulating valve 19 remains closed.

If there is leakage from the brake pipe 12, and the brake pipe pressure is thereby reduced, the reduced pressure in chamber 24 permits the equalizing reservoir pressure in spring chamber 38 to deflect the diaphragm 22 so as to unseat the regulating valve 19 against the pressure of spring 47.

Piston chamber 14 being connected through passage 21 to chamber 20, fluid in chamber 14 is vented to the brake pipe 12 at a rate faster than supplied through the choke 40, from the fluid at main reservoir pressure in chamber 16, thus causing a lowering of the pressure in chamber 14. The main reservoir pressure in valve chamber 16, acting on the opposite side of piston 15, then causes said piston to shift against the reduced pressure in piston chamber 14 and against the pressure of the springs 41 and 42.

The movement of the piston 15 causes movement of the slide valve 17, so that the ports 48 register with the ports 49 in the slide valve seat and permit fluid at main reservoir pressure from valve chamber 16 to flow to chamber 50, thence through the Venturi tube 46 into pipe 18 and to the brake pipe 12 through passage 44 and a cavity in the rotary valve 7, thus causing the brake pipe pressure to be increased.

The amount of opening of the regulating valve 19 varies according to the degree of brake pipe leakage and consequent rate of flow through the Venturi tube 46, since as the rate of flow through said Venturi tube increases, the well known venturi action causes a corresponding increase in the rate of flow from chamber 24, at the face of diaphragm 22, and a consequent increased movement of diaphragm 22 by the equalizing reservoir pressure, and resulting in an increased opening movement of the regulating valve 19.

Increasing the opening movement of the valve 19, as above described, causes an increased rate of flow from piston chamber 14 to the brake pipe, and consequently the piston 15 tends to move so as to more nearly approach full registration of the ports 48 with the ports 49, and a consequent more rapid flow of fluid from the main reservoir to the brake pipe to compensate for a greater brake pipe leakage.

It should be noted that the maintaining valve device 2 is located between the main reservoir 4 and the brake valve device 1, so that main reservoir pressure is constantly effective on the supply piston 15. If the maintaining valve device were located between the brake valve device and the brake pipe, so that the brake valve device permitted the flow of fluid at main reservoir pressure to valve chamber 16 of the maintaining valve device only in maintaining position of said brake valve device, the sudden increase of pressure in valve chamber 16, upon said brake valve movement, would cause the piston 15 to shift the slide valve 17 so as to cause a full registration of ports 48 with ports 49 and a consequent sudden flow of fluid from the main reservoir to the brake pipe, with the result that the brake pipe pressure would be momentarily increased to a higher pressure than in the equalizing reservoir 5, with the result that some of the brakes on the train might be released. With the maintaining valve device located between the main reservoir and the brake valve device, the maintaining valve device is constantly subject to fluid at main reservoir pressure, so that the above undesired action is prevented.

The addition of the maintaining valve device 2 to a fluid pressure brake equipment does not interfere with the usual operation of the equipment in any way and is operative only in a position of the brake valve device 1, other than the usual operating positions of said brake valve device.

Having now described my invention, what I claim as new and desire to secure by Letters Patent, is:—

1. In a fluid pressure brake, the combination with a main reservoir, a brake pipe, a brake valve device having a brake pipe pressure maintaining position, and an equalizing reservoir, of a valve device for maintaining the pressure in the brake pipe comprising a valve for supplying fluid under pressure to the brake pipe, only in the brake pipe pressure maintaining position of said brake valve device, a movable abutment for operating said valve and subject on one side at all times to fluid at main reservoir pressure and having the opposite side supplied with fluid from the main reservoir through a restricted port, and means controlled by the opposing pressures of the brake pipe and the equalizing reservoir for venting fluid from one side of said movable abutment.

2. In a fluid pressure brake, the combination with a main reservoir, brake pipe, brake valve device, and an equalizing reservoir, of a valve device for maintaining the pressure in the brake pipe comprising a valve for supplying fluid from the main reservoir to the brake pipe, a movable abutment for operating said valve and constantly subject on one side to fluid at main reservoir pressure and having a passage for supplying fluid from the main reservoir to the opposite side, and means subject to the opposing pressures of the brake pipe and the equalizing reservoir for controlling the operation of said abutment.

3. In a fluid pressure brake, the combination with a main reservoir, a brake pipe, a brake valve device having a position for maintaining the pressure in the brake pipe, and an equalizing reservoir, of a valve device for maintaining the pressure in the brake pipe through a communication open to the brake pipe only in the maintaining position of the brake valve device and comprising a valve for controlling the supply of fluid from the main reservoir to the brake pipe, a movable abutment for operating said valve having one side constantly subject to main reservoir pressure and having a passage for supplying fluid at main reservoir pressure to the opposite side, and regulating means subject to the opposing pressures of the brake pipe and said equalizing reservoir for controlling the operation of said movable abutment.

In testimony whereof I have hereunto set my hand.

CLYDE C. FARMER.